United States Patent
Lienert et al.

(10) Patent No.: US 8,921,469 B2
(45) Date of Patent: Dec. 30, 2014

(54) SOLVENT COMPOSITION AND WIRE COATING MEDIUM

(75) Inventors: Klaus-Wilhelm Lienert, Hamburg (DE); Giancarlo Soncini, Rio Claro (BR)

(73) Assignee: Elantas GmbH, Wesel (DE)

( * ) Notice: Subject to any disclaimer, the term of this patent is extended or adjusted under 35 U.S.C. 154(b) by 292 days.

(21) Appl. No.: 13/388,328

(22) PCT Filed: Jul. 19, 2010

(86) PCT No.: PCT/EP2010/060428
§ 371 (c)(1),
(2), (4) Date: Apr. 16, 2012

(87) PCT Pub. No.: WO2011/015447
PCT Pub. Date: Feb. 10, 2011

(65) Prior Publication Data
US 2012/0196964 A1    Aug. 2, 2012

(30) Foreign Application Priority Data
Aug. 6, 2009 (DE) .......................... 10 2009 026 343

(51) Int. Cl.
  *C09D 7/00* (2006.01)
  *C09D 129/14* (2006.01)
  *H01B 3/44* (2006.01)
  *C08L 61/00* (2006.01)
  *C08L 75/04* (2006.01)

(52) U.S. Cl.
  CPC .............. *C09D 7/001* (2013.01); *C09D 129/14* (2013.01); *H01B 3/446* (2013.01); *C08L 61/00* (2013.01); *C08L 75/04* (2013.01)
  USPC ............................ 524/379; 524/315; 524/476

(58) Field of Classification Search
  CPC ...... C09D 7/001; C09D 129/14; H01B 3/446; C08L 61/00; C08L 61/02; C08L 61/04–61/14; C08L 61/20–61/28; C08L 75/04
  USPC .......................................... 524/315, 379, 476
  See application file for complete search history.

(56) References Cited

U.S. PATENT DOCUMENTS

| | | |
|---|---|---|
| 2,917,416 A | 12/1959 | Lavin et al. |
| 2,917,482 A | 12/1959 | Lavin et al. |
| 3,068,189 A | 12/1962 | Lavin et al. |
| 3,104,236 A | 9/1963 | Lavin et al. |
| 3,342,893 A | 9/1967 | Emmons et al. |
| 3,400,172 A | 9/1968 | Payette |
| 3,468,973 A | 9/1969 | Emmons et al. |
| 3,606,922 A | 9/1971 | Doggett |
| 4,126,597 A | 11/1978 | Walrath et al. |
| 4,150,190 A | 4/1979 | Walrath et al. |
| 4,448,622 A | 5/1984 | Duchane et al. |
| 5,250,614 A | 10/1993 | Ono et al. |
| 7,521,498 B2 | 4/2009 | Stevens et al. |
| 2007/0031672 A1 | 2/2007 | Boehm et al. |

FOREIGN PATENT DOCUMENTS

| | | |
|---|---|---|
| CN | 101243148 A1 | 8/2008 |
| DE | 2740215 A1 | 10/1978 |
| DE | 4133161 A1 | 4/1993 |
| GB | 527729 A | 10/1940 |
| GB | 578882 | 7/1946 |
| GB | 810359 | 3/1959 |
| GB | 862165 | 3/1961 |
| GB | 938119 | 10/1963 |
| GB | 975455 | 11/1964 |
| GB | 1112186 | 5/1968 |
| GB | 1588939 A | 4/1981 |
| JP | S53117046 A | 10/1978 |
| JP | S58194536 A | 11/1983 |
| JP | H0436325 A | 2/1992 |

OTHER PUBLICATIONS

Excerpt from ROEMPP Online, Version 3.6, 2010, entry "Solvent Naphtha".
Excerpt from ROEMPP Online, Version 3.6, 2010, entry "Mesitylen".
Excerpt from ROEMPP Online, Version 3.21, 2012, entry "Ethanol".
Excerpt from ROEMPP Online, Version 3.21, 2012, entry "Toluol".

*Primary Examiner* — Edward Cain
(74) *Attorney, Agent, or Firm* — Abel Law Group, LLP

(57) ABSTRACT

Solvent composition comprising ethanol, aromatic hydrocarbon or hydrocarbon mixture, high-boiling solvent, wire enamel formulation based on polyvinyl formal and comprising the solvent composition, preparation process and use.

20 Claims, No Drawings

SOLVENT COMPOSITION AND WIRE COATING MEDIUM

The present application claims the priority of DE 10 2009 026 343.8. The priority document is incorporated by reference in its entirety.

All of the documents cited in the present application are incorporated by reference in their entirety.

BACKGROUND OF THE INVENTION

1. Field of the Invention

The present invention relates to a specific solvent composition, to a wire coating composition comprising polyvinyl formal as binder and the solvent composition, and to preparation processes and use.

2. Discussion of Background Information

The wire coating compositions typically used today are generally solutions of the standard binders, such as polyvinyl formals, polyesters, polyesterimides and polyurethane resins, for example, in cresolic solvents, if desired in combination with commercial hydrocarbon diluents.

Wire coating compositions based on polyvinyl formals have been known for a long time. The binder is composed of polyvinyl alcohol which has been reacted with aldehydes to form polyvinyl formal. The polymer retains residual ester groups from the hydrolysis of the polyvinyl acetate to the polyvinyl alcohol, and also free OH groups which have not reacted with the aldehydes. Via these OH groups, with the aid of other resins, crosslinking takes place in order to produce a thermoset film on the copper wire.

GB 578 882 describes a wire enamel composed of a polyvinyl formal resin in combination with a melamine resin.

The combination of polyvinyl formal resin with phenolic resin is described in GB 810 359 and GB 862 165.

The crosslinking of the polyvinyl formal resin with blocked isocyanates is subject matter of GB 938 119.

The combination of all of the listed crosslinkers is described in GB 975 455 and GB 1 112 186.

Common to all the polyvinyl formal wire enamels is the low solids content of the wire enamels, which is in the range of 20% to 30%. The solvent composition is frequently cresol with solvent naphtha, usually in a 1:1 ratio. The cresolic solvents are typically a technical mixture of various cresol and xylenol isomers, which may also include phenol. Diluents used include xylene, solvent naphtha, toluene, ethylbenzene, cumene, heavy benzene, various Solvesso and Shellsol grades, and also Deasol. At solids contents of 20-22%, these wire enamels frequently have viscosities in the range of 3000-6000 mPas. Increasing the solids content would cause a sharp rise in viscosity and mean that the enamels could not longer be applied by coating. Cresol, moreover, is toxic and hence disadvantageous on environmental and operational grounds.

The disadvantage of the known wire coating compositions based on polyvinyl formal resins is, additionally, that they have low solids contents and high viscosities, and also contain large quantities of cresol as solvent.

Cresol-free wire enamels are in fact known, and are described in DE 41 33 161 and U.S. Pat. No. 7,521,498, for example. But not for wire enamels based on polyvinyl formal. The literature frequently describes, as alternative solvents, dimethyl glycol, ethyl glycol, isopropyl glycol, butyl glycol, methyl diglycol, ethyl diglycol and butyl diglycol. Also contemplated are glycol ether esters, examples being methyl glycol acetate, ethyl glycol acetate, butyl glycol acetate and methoxypropyl acetate. Further examples are cyclic carbonates, such as polypropylene carbonate, cyclic esters, gamma-butyrolactone, and dimethylformamide, N,N-dimethylacetamide and N-methylpyrrolidone. Use may additionally be made of aromatic solvents, benzyl alcohol, if desired in combination with the aforementioned solvents.

DE 27 40 215 A1 discloses wire enamels which are based on polyvinyl formal resin and which necessarily comprise particular glycol ethers as a solvent component.

The prior art to date has not disclosed optimal solvents for wire enamel formulations based on polyvinyl formal.

Problem:

The problem addressed by the present invention is that of developing a wire enamel based on polyvinyl formal that does not have the disadvantages depicted and that can be formulated without cresol without any consequent adverse effect on the performance properties.

Another problem addressed by the present invention was that of providing innovative solvent compositions which have particularly good properties, being more particularly of very low toxicity and having an outstanding capacity to dissolve coating materials, more particularly wire enamels based on polyvinyl formal.

Solution:

This problem is solved by a particular solvent composition, and also by wire enamel formulations based on polyvinyl formal that comprise a particular solvent composition, the solvent composition comprising ethanol.

DEFINITIONS

In the context of the present invention, all quantities, unless indicated otherwise, should be understood as being by weight.

In the context of the present invention, the term "room temperature" denotes a temperature of 23° C. Temperatures, unless otherwise indicated, are in degrees Celsius (° C.).

Unless indicated otherwise, the stated reactions and process steps are carried out at standard/atmospheric pressure, i.e. at 1013 mbar.

The expression (meth)acryl—should be interpreted in the context of the present invention to refer not only to methacryl—but also to acryl- and mixtures of both.

In the context of the present invention, here and below, the solids content is the sum of the constituents of a wire enamel formulation that constitute the solid material in the resultant products after curing.

Solvents having a high boiling point/high-boiling solvents in the context of the present invention are those whose boiling point is at least 160° C. (under 1013 mbar pressure).

DETAILED DESCRIPTION

The present invention relates to
a solvent composition comprising ethanol, aromatic hydrocarbon or hydrocarbon mixture, high-boiling solvent,
uses of the solvent composition,
wire enamel formulations based on polyvinyl formal and comprising the solvent composition,
processes for preparing the wire enamel formulations and use of the wire enamel formulations.

The solvent composition of the invention is composed of the following constituents:
  5-40, preferably 10-30, more preferably 12-25, parts by weight of ethanol,
  10-55, preferably 15-45, more preferably 18-40, parts by weight of aromatic hydrocarbon or hydrocarbon mixture, 0-50, preferably 5-40, more preferably 8-35, parts by weight of a high-boiling solvent.

In one variant of the present invention, the solvent composition is composed of the three stated constituents (ethanol, aromatic hydrocarbon or hydrocarbon mixture, and high-boiling solvent) and additionally 0-3 parts by weight of further solvents, examples being cresolic solvents, which may be a technical mixture of various cresol and xylenol isomers, which may also include phenol.

In another variant of the present invention, the solvent composition is composed of the three stated constituents (ethanol, aromatic hydrocarbon or hydrocarbon mixture, and high-boiling solvent) and additionally 0-5 parts by weight of further solvents, examples being cresolic solvents, which may be a technical mixture of various cresol and xylenol isomers, which may also include phenol.

Suitable aromatic hydrocarbons are more particularly toluene and technical, aromatic-containing hydrocarbon cuts, including xylene, solvent naphtha, toluene, ethylbenzene, cumene, heavy benzene, various Solvesso and Shellsol grades, and Deasol.

Very preferred in accordance with the invention is toluene.

Established solvents with a high boiling point include high-boiling alcohols, including diacetone alcohol and benzyl alcohol. It is also possible to employ high-boiling esters, including dimethyl phthalate, dimethyl adipate, dimethyl succinate and dimethyl glutarate. Glycol esters, including butyl glycol acetate and ethyl diglycol acetate, have likewise established themselves as high boilers, and can be used in the solvent composition of the invention.

In one preferred variant, solvents with a high pointing point that are used are high-boiling esters, including dimethyl phthalate, dimethyl adipate, dimethyl succinate and dimethyl glutarate.

It is also possible to employ mixtures of the stated high-boiling esters.

Very preferred in accordance with the invention is dimethyl phthalate.

Particularly preferred in accordance with the invention is a solvent composition of ethanol, toluene and dimethyl phthalate.

In one variant of the present invention, the ethanol used can be bioethanol, thereby further improving the $CO_2$ balance and hence the environmental advantage of the solvent composition of the invention.

From the standpoints of the environment, operation, and safety, the solvent composition of the invention is very much better than cresol-containing solvents, since in contrast to cresol it is not toxic (in the sense of hazardous substance classification).

The solvent composition of the invention is capable of dissolving a very wide variety of binders and crosslinkers.

It is particularly suitable, surprisingly, for coating materials, especially wire enamels, more particularly wire enamel compositions based on polyvinyl formal.

The solvent compositions of the invention are accordingly used preferably for coating materials, more preferably for wire enamels, and with particular preference for wire enamel compositions based on polyvinyl formal.

The wire enamel formulations of the invention are known per se and differ from those of the prior art only in that they comprise the solvent compositions of the invention.

Binders which can be used in the context of the present invention are all of the binders that are typical within this technical field.

It is preferred in accordance with the invention to formulate wire enamel formulations on the basis of polyvinyl formal resin.

Commercially customary polyvinyl formal resins differ in molecular weight, OH number and ester group content; in accordance with the invention it is possible to employ all of the polyvinyl formal resins, and mixtures thereof, that are available on the market.

In addition to the pure binders, crosslinkers are used as well in the context of the present invention.

In the context of the present invention, crosslinkers used are the following compounds: blocked polyisocyanates, phenolic resins, melamine resins, urea resins, etc., selected more particularly from the group consisting of blocked polyisocyanates, phenolic resins, melamine resins, urea resins and mixtures thereof.

A particularly preferred crosslinker used is a combination of a cresol-blocked polyisocyanate, a phenolic resin and a melamine resin.

A polyisocyanate which is particularly preferred in accordance with the invention is trimethylolpropane-branched and comprises 4,4-methylenediphenyl diisocyanate.

In accordance with the invention it is also possible to employ phenolic resins based on alkylated resoles, the use of which for curing OH polyesters is known from the prior art.

It is additionally possible in accordance with the invention to use melamine resins. These resins are likewise known from the prior art for the crosslinking of OH polyester.

Besides the binders, crosslinkers and solvents, the wire enamels of the invention may also comprise further constituents selected from dyes, flow control assistants and agents, catalysts and mixtures thereof.

Wire enamel formulations having particularly good properties have the following constitution:
  5%-40%, preferably 10%-30%, more preferably 12%-25% by weight of ethanol,
  10%-55%, preferably 15%-45%, more preferably 18%-40% by weight of aromatic hydrocarbon or hydrocarbon mixture,
  0%-50%, preferably 5%-40%, more preferably 8%-35% by weight of a high-boiling solvent,
  10%-40%, preferably 15%-35%, more preferably 20%-30% by weight of binder and crosslinker,
the figures being based in each case on the total weight of the wire enamel formulation, which represents 100% by weight, and adding up to 100% by weight.

In one variant of the present invention, the wire enamel formulation is composed of the four stated constituents (ethanol, aromatic hydrocarbon or hydrocarbon mixture, high-boiling solvent, and binder+crosslinker) and additionally 0-3 parts by weight of further solvents, examples being cresolic solvents, which may be a technical mixture of various cresol and xylenol isomers, which may also include phenol. Here as well the figures are based in each case on the total weight of the wire enamel formulation, which represents 100% by weight, and add up to 100% by weight.

In another variant of the present invention, the wire enamel formulation is composed of the four stated constituents (ethanol, aromatic hydrocarbon or hydrocarbon mixture, high-boiling solvent, and binder+crosslinker) and additionally 0-5 parts by weight of further solvents, examples being cresolic solvents, which may be a technical mixture of various cresol and xylenol isomers, which may also include phenol. Here as well the figures are based in each case on the total weight of the wire enamel formulation, which represents 100% by weight, and add up to 100% by weight.

The solvent compositions of the invention have turned out surprisingly to be optimum solvents for the above-described wire enamel compositions, with especially good suitability being possessed by the particularly preferred solvent composition of ethanol, toluene and dimethyl phthalate.

The process of the invention for preparing wire enamel formulations is characterized in that
a) the solvent composition is introduced,
b) the polyvinyl formal resin is dissolved therein at elevated temperature,
c) the solution is cooled and the remaining components are added, and
d) the wire enamel is homogenized and optionally filtered.

This may be followed by further dilution of the wire enamel formulation to the desired application viscosity, for which it is preferred to utilize the solvent composition of the invention.

The homogenization in step d) is accomplished preferably by stirring, although other homogenization techniques are also possible, such as by means of ultrasound, for example.

The filtration in step d) takes place in one variant of the present invention through a 5-10 my filter.

The polyvinyl formal wire enamels of the invention can be applied by means of customary wire enamelling machines and cured. The enamel film thickness needed in each specific case can be built up by at least 1 up to 10 individual applications, with each individual application of enamel being cured to a bubble-free state before the next application of enamel. Typical enamelling machines operate with take-off speeds of 5 up to 180 m/min, depending on the thickness of the wire to be coated. Typical oven temperatures are situated between 300 and 550° C.

The various embodiments of the present invention, such as those of the various dependent claims, for example, can be combined with one another in any desired way.

The invention is now illustrated with reference to the following, non-limiting examples.

Example 1

PU Crosslinker 29.5 g of m,p-cresol and 27.8 g of 4,4-methylenediphenyl diisocyanate were reacted at 110° C. in a three-necked flask equipped with stirrer, reflux condenser, nitrogen inlet tube. After 30 minutes, 5.5 g of trimethylolpropane and 0.01 g of dibutyltin dilaurate were added and the batch was held at 130° C. for 2 hours. The batch was diluted with 18.0 g of m,p-cresol and 20 g of Solvesso 100. The crosslinker had a solids content of 40.3% with a viscosity of 6280 mPas.

Example 2

Polyvinyl Formal Wire Enamel 1

A three-necked flask equipped with stirrer, reflux condenser and nitrogen inlet tube was charged with 29.0 g of toluene, 20.0 g of ethanol and 19.5 g of dimethyl phthalate and this initial charge was heated to 75° C. At 75° C., 13.5 g of polyvinyl formal resin (Vinylec®) were added. After 2 hours, the batch was cooled to 60° C. The batch was admixed with 3.9 g of PU crosslinker from Example 1, 8.6 g of a commercial resole (80% strength in butanol) (Phenodur® PR612) and 0.5 g of a commercial melamine resin (Priam® RMF 7960). The viscosity was adjusted to 2800 mPas using 5.0 g of toluene. Determination of the solids content gave a figure of 21.0%.

Example 3

Polyvinyl Formal Wire Enamel 2

A three-necked flask equipped with stirrer, reflux condenser and nitrogen inlet tube was charged with 34.9 g of toluene, 23.0 g of ethanol and 10.3 g of dimethyl phthalate and this initial charge was heated to 75° C. At 75° C., 13.5 g of polyvinyl formal resin (Vinylec®) were added. After 2 hours, the batch was cooled to 60° C. The batch was admixed with 3.9 g of PU crosslinker from Example 1, 8.6 g of a commercial resole (80% strength in butanol) (Phenodur® PR612) and 0.5 g of a commercial melamine resin (Priam® RMF 7960). The viscosity was adjusted to 2450 mPas using 5.0 g of toluene. Determination of the solids content gave a figure of 20.7%.

Example 4

Polyvinyl Formal Wire Enamel 3

A three-necked flask equipped with stirrer, reflux condenser and nitrogen inlet tube was charged with 20.5 g of toluene, 13.7 g of ethanol and 34.3 g of dimethyl phthalate and this initial charge was heated to 75° C. At 75° C., 13.5 g of polyvinyl formal resin (Vinylec®) were added. After 2 hours, the batch was cooled to 60° C. The batch was admixed with 3.9 g of PU crosslinker from Example 1, 8.6 g of a commercial resole (80% strength in butanol) (Phenodur® PR612) and 0.5 g of a commercial melamine resin (Priam® RMF 7960). The viscosity was adjusted to 3480 mPas using 5.0 g of toluene. Determination of the solids content gave a figure of 21.2%.

Example 5

Comparative Example: Cresolic Polyvinyl Formal Wire Enamel

A three-necked flask equipped with stirrer, reflux condenser and nitrogen inlet tube was charged with 30 g of m,p-cresol and this initial charge was heated to 75° C. At 75° C., 13.5 g of polyvinyl formal resin (Vinylec®) were added. After 2 hours, the batch was cooled to 60° C. The batch was admixed with 3.9 g of PU crosslinker from Example 1, 8.6 g of a commercial resole (80% strength) (Phenodur® PR612) and 0.5 g of a commercial melamine resin (Priam® RMF 7960). The viscosity was adjusted to 6500 mPas using 44.0 g of Solvesso 100. The solids content was 20.8%.

Example 6

Enamelling Results

The polyvinyl formal wire enamel 1 was applied on a standard industry vertical enamelling machine under the following enamelling conditions:
Wire diameter: 4.124 mm
Diameter increase: 0.097 mm
Number of passes: 10
Testing took place in accordance with IEC 851.
Elongation at break: 37%
Breakdown voltage: 14 300 V
Outer fibre elongation: 39%+3xd
Thermal shock (30%+1xd): satisfactory at 200° C./30 min.
Pinholes: none The polyvinyl formal enamels 2 and 3 and also the cresolic enamel produced identical enamelling results.

What is claimed is:

1. A wire enamel formulation based on polyvinyl formal, wherein the formulation comprises:
   from 5% to 40% by weight of (a) ethanol,
   from 10% to 55% by weight of (b) aromatic hydrocarbon or hydrocarbon mixture,
   from 0% to 50% by weight of (c) high-boiling solvent having a boiling point of at least 160° C. which is at least one of an alcohol, an ester, and a glycol ester,
   from 0% to 5% by weight of (d) one or more solvents which are different from (a) to (c)
   from 10% to 40% by weight of (e) binder comprising polyvinyl formal resin and crosslinker,
the above percentages being based in each case on the total weight of the wire enamel formulation which represents 100% by weight and adding up to 100% by weight.

2. The formulation of claim 1, wherein (b) comprises toluene.

3. The formulation of claim 1, wherein (c) comprises at least one of dimethyl phthalate, dimethyl adipate, dimethyl succinate, and dimethyl glutarate.

4. The formulation of claim 1, wherein (c) comprises dimethyl phthalate.

5. The formulation of claim 1, wherein the formulation comprises toluene and dimethylphthalate.

6. The formulation of claim 1, wherein the formulation comprises from 10% to 30% by weight of (a), from 15% to 45% by weight of (b), from 5% to 40% by weight of (c), and from 15% to 35% by weight of (e).

7. The formulation of claim 6, wherein the formulation comprises toluene and dimethylphthalate.

8. The formulation of claim 1, wherein the formulation comprises from 12% to 25% by weight of (a), from 18% to 40% by weight of (b), from 8% to 35% by weight of (c), and from 20% to 30% by weight of (e).

9. The formulation of claim 8, wherein the formulation comprises toluene and dimethylphthalate.

10. The formulation of claim 1, wherein the formulation further comprises one or more additives selected from dyes, levelling agents, catalysts, and mixtures thereof.

11. The formulation of claim 1, wherein the crosslinker comprises one or more substances selected from blocked polyisocyanates, phenol resins, melamine resins, urea resins.

12. The formulation of claim 1, wherein the crosslinker comprises a cresol-blocked polyisocyanate, a phenol resin, and a melamine resin.

13. A method of coating a winding wire, wherein the method comprises applying to the winding wire the wire enamel formulation of claim 1.

14. A process of preparing a wire enamel formulation of claim 1, wherein the process comprises dissolving the polyvinyl formal resin in the solvent components at elevated temperature, cooling a resultant solution, adding remaining components, and thereafter homogenizing and optionally filtering a resultant formulation.

15. A solvent composition for making wire enamel formulations, wherein the composition comprises:
   from 5 to 40 parts by weight of (a) ethanol,
   from 10 to 55 parts by weight of (b) aromatic hydrocarbon or hydrocarbon mixture,
   from 5 to 50 parts by weight of (c) high-boiling solvent having a boiling point of at least 160° C. which is at least one of an alcohol, an ester, and a glycol ester,
and wherein (b) comprises toluene and (c) comprises dimethylphthalate.

16. The solvent composition of claim 15, wherein the composition comprises from 10 to 30 parts by weight of (a), from 15 to 45 parts by weight of (b), and from 5 to 40 parts by weight of (c).

17. The solvent composition of claim 15, wherein the composition comprises from 12 to 25 parts by weight of (a), from 18 to 40 parts by weight of (b), and from 8 to 35 parts by weight of (c).

18. A method of dissolving a coating material in a solvent, wherein the method comprises dissolving the material in the solvent composition of claim 15.

19. The method of claim 18, wherein the coating material is a wire enamel or an impregnating varnish.

20. A method of dissolving a wire enamel or an impregnating varnish in a solvent,
wherein the method comprises dissolving the wire enamel or impregnating varnish in a solvent composition which comprises:
   from 5 to 40 parts by weight of (a) ethanol,
   from 10 to 55 parts by weight of (b) aromatic hydrocarbon or hydrocarbon mixture,
   from 5 to 50 parts by weight of (c) high-boiling solvent having a boiling point of at least 160° C. which is at least one of an alcohol, an ester, and a glycol ester.

* * * * *